H. S. LANGE.
HYDRANT, STAND PIPE, AND THE LIKE.
APPLICATION FILED FEB. 16, 1909.
938,064.
Patented Oct. 26, 1909.
2 SHEETS—SHEET 1.
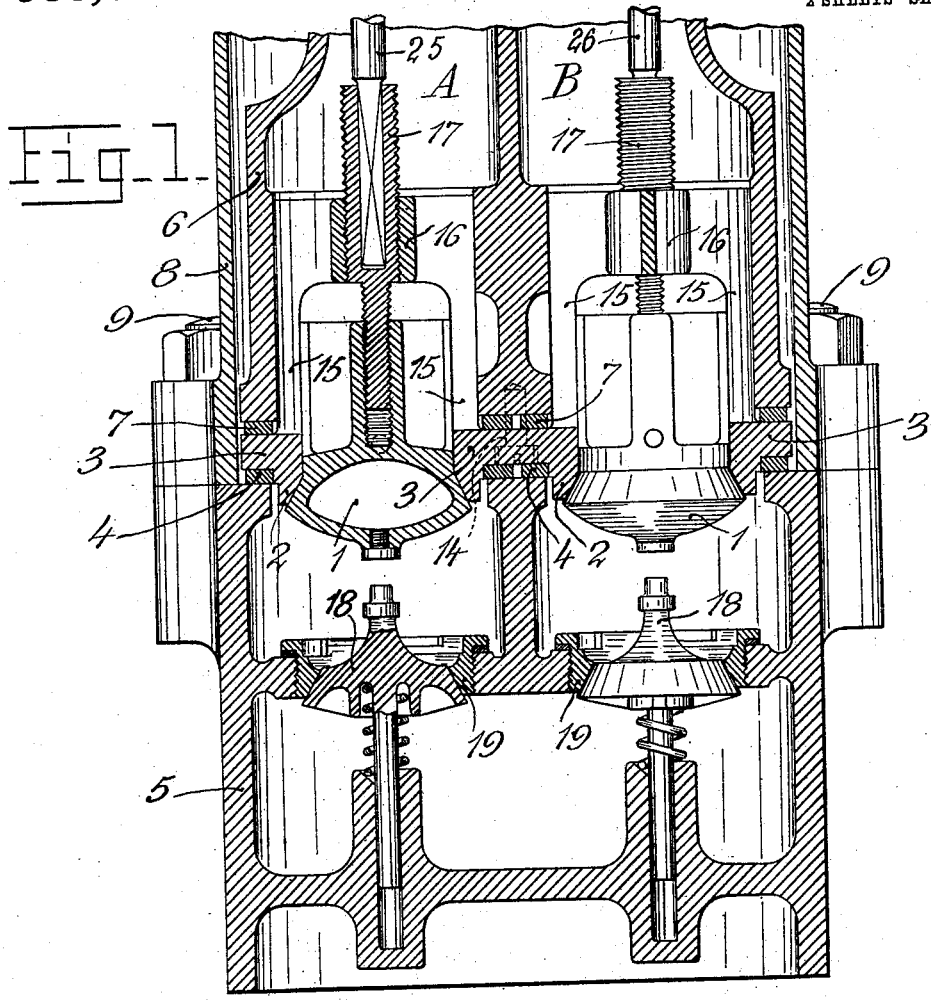
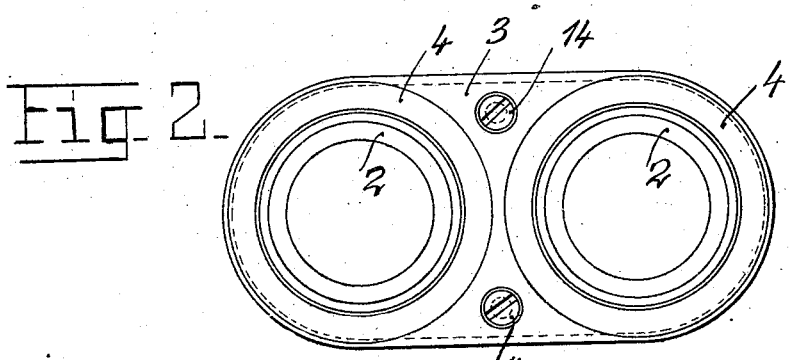
Witnesses:
Inventor:
H. S. Lange
by
Attorney H. S. LANGE.
HYDRANT, STAND PIPE, AND THE LIKE.
APPLICATION FILED FEB. 16, 1909.
938,064.
Patented Oct. 26, 1909.
2 SHEETS—SHEET 2.
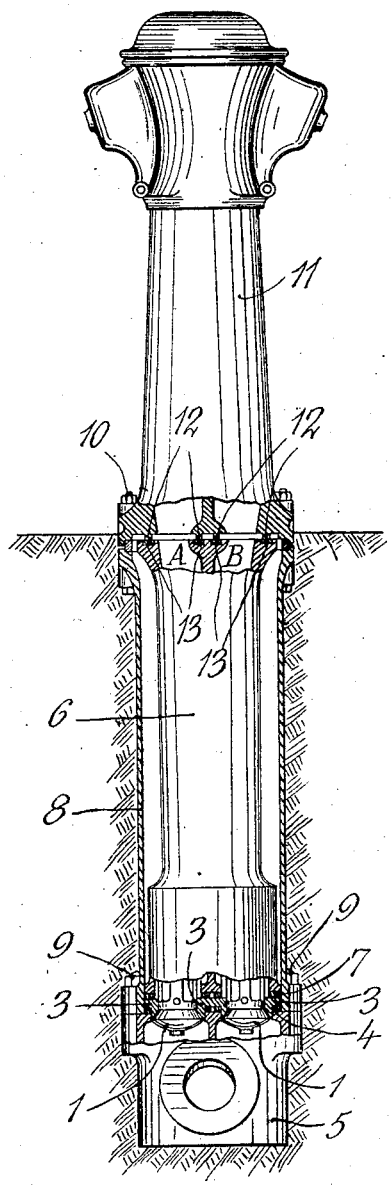
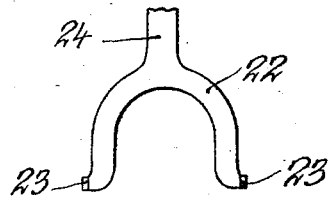
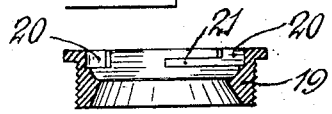
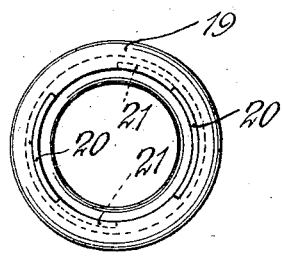
Witnesses:
Inventor:
H. S. Lange
Attorney

UNITED STATES PATENT OFFICE.

HANS STEENBUCH LANGE, OF CHRISTIANIA, NORWAY.

HYDRANT, STAND-PIPE, AND THE LIKE.

938,064.  Specification of Letters Patent.  Patented Oct. 26, 1909.

Application filed February 16, 1909. Serial No. 478,286.

*To all whom it may concern:*

Be it known that I, HANS STEENBUCH LANGE, manufacturer, citizen of Norway, residing at the city of Christiania, Norway, have invented new and useful Improvements in Hydrants, Stand-Pipes, and the Like, of which the following is a specification.

In hydrants, stand-pipes and the like hitherto used, the valve or valves through which the water under pressure is supplied are usually arranged in the lower portion of that part of the hydrant which is buried in the earth. If such valves are to be inspected or repaired they must be arranged in such a manner that they can be reached from the outer protecting casing. For this purpose the construction according to the present invention is of such a nature that the valve together with seat and guiding cross head and all parts requiring inspection, repairs or substitution will follow up with the hydrant pipe, in which the two outlets are formed, as soon as the said pipe is lifted up from the outer protecting casing.

The invention is illustrated in the accompanying drawings in which:

Figure 1 is a vertical section through that portion of the hydrant which is buried in the ground and provided with two outlets. Fig. 2 shows the main valves from below. Fig. 3 is an elevation, partly in section, of the whole hydrant. Figs. 4 and 5 are vertical section and plan view of the auxiliary valve seats, and Fig. 6 shows the lower portion of a key, by which the seats of the auxiliary valves may be screwed fast or released.

The downwardly opening main valves —1— are made as seat valves and engage conical seats —2—, which as shown are made in one piece —3—, which has approximately the shape of a plate. This plate rests upon packing rings —4—, which surround the valve openings and are supported upon the lowermost member —5— of the hydrant. Between the seat —3— and the member —6— forming the two hydrant outlets —A— and —B—, are also arranged packing rings —7—.

—8— designates the outer protecting casing, which by means of bolts —9— is rigidly united with the member —5— and which extends up to the surface of the ground, (see Fig. 3), the casing at this point being connected with that part —11— of the hydrant extending above the ground by means of bolts —10—. The upper part —11— is provided with ribs —12—, which through the intermediary of packings —13— press against the upper end of the casing —6—, so that the latter, by tightening the bolts —10— is simultaneously pressed downward and thereby through the rings —7— presses upon the seat —3— in order to clamp the same fast and tighten the joints by means of the packing rings —4— and —7—.

The seat —3— is attached to the under side of the piece —6— by means of two screws —14— and carries the cross ribs —15— which guide the main valve —1—. These ribs are, at their upper part, united with the hub —16—, which supports the screw sleeve —17—, of the valve.

It will be seen, that as soon as the bolts —10— have been released and the upper part —11— of the hydrant removed the inner outlet-piece —6— can be lifted up. This member by means of the screws —14— takes with it the seat —3—, which in turn by means of the cross ribs —15—, the hub —16— and the sleeve —17— takes with it the main valves —1—. By this construction the hydrant is easily mounted and all its important parts, which on account of their deep location are not directly accessible, can readily be lifted up in order to be inspected, worked, repaired, changed etc.

The seats —19— of the auxiliary valves —18— may be attached by means of screw threads and are preferably provided at the upper flange with bayonet grooves —20, 21— (Figs. 4 and 5), into which can be inserted a key (Fig. 6), the lower forked end —22— of which is provided with two diametrically located teeth or ribs —23—. During the downward movement of the key stem —24— and its succeeding rotation the ribs —23— will move into the innermost part —21— of the bayonet groove. Upon the lifting up of the pipe —6— together with the main valves and appurtenances as mentioned above, the key is lowered through the casing —8— and inserted into the grooves —20, 21—, whereafter from the ground line, the seats —19— may be loosened and lifted up. The auxiliary valves —18— then may be lifted up by suitable tools (not shown).

Having now described my invention, what I claim as new and desire to secure by Letters Patent is:—

1. A hydrant comprising a casing, a removable piece 6 therein having a water outlet, a plate carrying the valve seats removably secured to the said piece 6, said piece having guiding cross ribs thereon for the main valve, a screw threaded hub carried by said ribs, a screw threaded sleeve passing through said hub, and a valve connected with said sleeve.

2. A hydrant comprising a casing, a removable piece 6 therein, a plate carrying the main valve seat removably secured to said piece 6, a plate carrying valve seats for the auxiliary valves secured to the lower part of the casing, a seat for the auxiliary valve screwing in said plate, and having a bayonet slot near its upper edge and adapted to receive a key whereby the seat may be removed or placed in position, and main and auxiliary valves.

In testimony whereof I have signed my name to this specification in the presence of two subscribing witnesses.

HANS STEENBUCH LANGE.

Witnesses:
RICHARD STOKKE,
MAGNES FAAS BUGGE.